United States Patent
Yoshida et al.

(10) Patent No.: US 8,433,481 B2
(45) Date of Patent: Apr. 30, 2013

(54) OPENING AND CLOSING CONTROL APPARATUS FOR ROOF PANEL FOR VEHICLE

(75) Inventors: Akimasa Yoshida, Takahama (JP); Tomoaki Imaizumi, Toyokawa (JP); Tatsuo Kamakura, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 840 days.

(21) Appl. No.: 12/512,153

(22) Filed: Jul. 30, 2009

(65) Prior Publication Data

US 2010/0032993 A1   Feb. 11, 2010

(30) Foreign Application Priority Data

Aug. 5, 2008   (JP) .................. 2008-202026

(51) Int. Cl.
    *B60J 7/043*   (2006.01)
(52) U.S. Cl.
    USPC .............. 701/49; 701/36; 318/466; 318/467; 318/468; 296/216.01; 296/223; 454/129
(58) Field of Classification Search ............. 701/36, 701/49; 318/466, 467, 468; 296/216.01, 296/223; 454/75, 129
    See application file for complete search history.

(56) References Cited

U.S. PATENT DOCUMENTS

| | | | |
|---|---|---|---|
| 4,082,341 A | | 4/1978 | Gore |
| 4,835,449 A | * | 5/1989 | Huehn ..................... 318/282 |
| 5,734,727 A | | 3/1998 | Flaherty et al. |
| 6,157,372 A | * | 12/2000 | Blackburn et al. ............ 345/173 |
| 7,933,703 B2 | | 4/2011 | Noro |

FOREIGN PATENT DOCUMENTS

| | | |
|---|---|---|
| CN | 101078325 A | 11/2007 |
| CN | 201049582 Y | 4/2008 |
| CN | 101214786 A | 7/2008 |
| EP | 0 290 106 A2 | 11/1988 |
| JP | 55145015 A * | 11/1980 |
| JP | 63-72213 U | 5/1988 |
| JP | 09-039578 A | 10/1997 |
| JP | 2002-240570 A | 8/2002 |
| JP | 3926992 B2 | 3/2007 |

OTHER PUBLICATIONS

European Search Report dated Mar. 31, 2011, issued in corresponding European Patent Application No. 09 01 0015.
First Office Action issued Oct. 31, 2012 in Chinese Application No. 20091015905.8.
Official Action issued by the Japanese Patent Office on Dec. 6, 2012 in Japanese Application No. 2008-202026, and an English translation of the Official Action (6 pages).

\* cited by examiner

*Primary Examiner* — Khoi Tran
*Assistant Examiner* — Spencer Patton
(74) *Attorney, Agent, or Firm* — Buchanan Ingersoll & Rooney

(57) ABSTRACT

An opening and closing control apparatus for a roof panel for a vehicle includes an opening and closing device for driving the roof panel to open and close, an operation command device for outputting an operation command for opening and closing the roof panel by means of an operation switch, a vehicle speed detecting device, and a controlling device for controlling an operation of the opening and closing device, the controlling device performing an open and close control for operating the opening and closing device to cause the roof panel to move to a predetermined position where the roof panel is opened to a predetermined degree which is specified beforehand on the basis of a vehicle speed when the operation command for opening the roof panel is output by the operation command device.

8 Claims, 6 Drawing Sheets

OPENING AND CLOSING CONTROL APPARATUS FOR ROOF PANEL FOR VEHICLE

CROSS REFERENCE TO RELATED APPLICATIONS

This application is based on and claims priority under 35 U.S.C. §119 to Japanese Patent Application 2008-202026, filed on Aug. 5, 2008, the entire content of which is incorporated herein by reference.

FIELD OF THE INVENTION

The present invention relates to an opening and closing control apparatus for a roof panel for a vehicle.

BACKGROUND

A known opening and closing control apparatus for a roof panel for a vehicle includes an opening and closing device for driving the roof panel to open and close, an operation command means for outputting an operation command for opening and closing the roof panel by means of an operation switch, a vehicle speed detecting means, and a controlling means for controlling an operation of the opening and closing device. Such opening and closing control apparatus is disclosed in JP3926992B. In order to prevent an occurrence of noise caused by air flowing into a vehicle interior, the opening and closing control apparatus disclosed includes a controlling means that performs an open and close control for operating an opening and closing device so that a roof panel moves to a predetermined position where the roof panel is opened to such an extent that air flowing into the vehicle interior is reduced. The open and close control is performed under the condition that the roof panel is moving to a fully open position and a vehicle speed detecting means detects a predetermined vehicle speed.

According to the aforementioned opening and closing control apparatus, a movement of the roof panel to the fully open position is conducted by a separate switch/button from that for the open and close control performed by the controlling means. In order to move the roof panel to the fully open position by operating the separate switch/button, in a case where the opening and closing device is operated by pressing and holding the separate switch/button to move the roof panel to the fully open position, the roof panel may not move to the fully open position against an intention of an operator if the pressing and holding time of the separate switch/button by the operator is insufficient. When the roof panel is not moving to the fully open position, the controlling means does not perform the open and close control even when the vehicle speed detecting means detects the predetermined speed.

A need thus exists for an opening and closing control apparatus for a roof panel for a vehicle which is not susceptible to the drawback mentioned above.

SUMMARY OF THE INVENTION

According to an aspect of the present invention, an opening and closing control apparatus for a roof panel for a vehicle includes an opening and closing device for driving the roof panel to open and close, an operation command device for outputting an operation command for opening and closing the roof panel by means of an operation switch, a vehicle speed detecting device, and a controlling device for controlling an operation of the opening and closing device, the controlling device performing an open and close control for operating the opening and closing device to cause the roof panel to move to a predetermined position where the roof panel is opened to a predetermined degree which is specified beforehand on the basis of a vehicle speed when the operation command for opening the roof panel is output by the operation command device.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
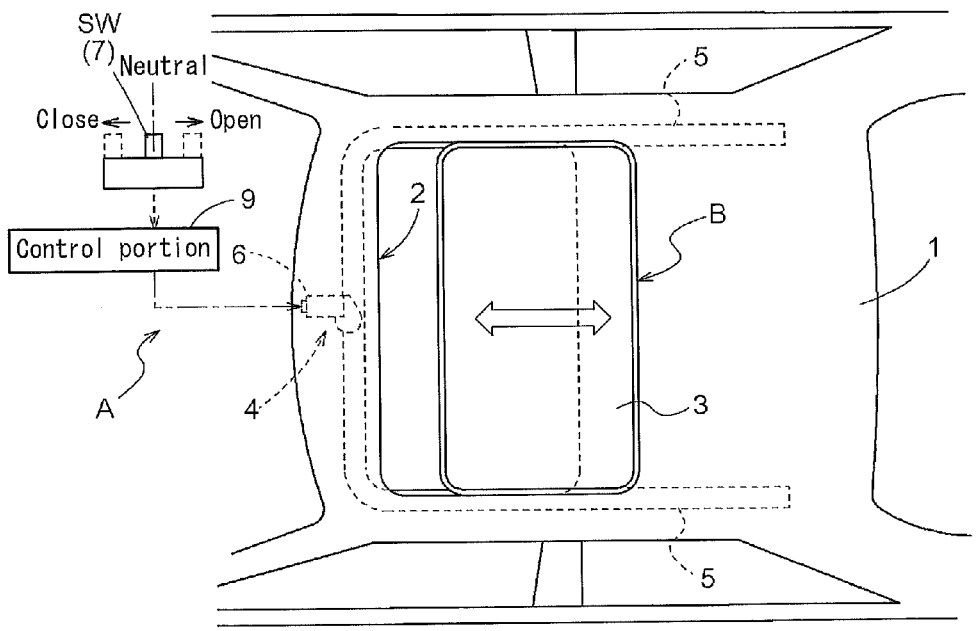
FIG. 1 is a schematic plan view illustrating a sunroof apparatus according to an embodiment of the present invention.

An embodiment of the present invention will be explained with reference to the attached drawings. FIG. 1 illustrates a sunroof apparatus B including a roof panel 3 and an opening and closing device 4. The roof panel 3 opens and closes an opening 2 formed at a roof for a vehicle (hereinafter simply referred to as a roof 1). The opening and closing device 4 drives the roof panel 3 to open and close.

The roof panel 3 is slidably movable along guide rails 5 provided at both sides of the opening 2 in a width direction of the vehicle (i.e., left and right sides of the opening 2). Then, the roof panel 3 is movable between a fully closed position arranged in a vehicle forward direction and a fully open position arranged in a vehicle rearward direction.

The opening and closing device 4 includes an electric motor with reduction gears 6 (hereinafter simply referred to as a motor 6) and a wire connected to the roof panel 3. The roof panel 3 is movable by a winding and a feeding of the wire that is driven by the motor 6.

Figure 2:
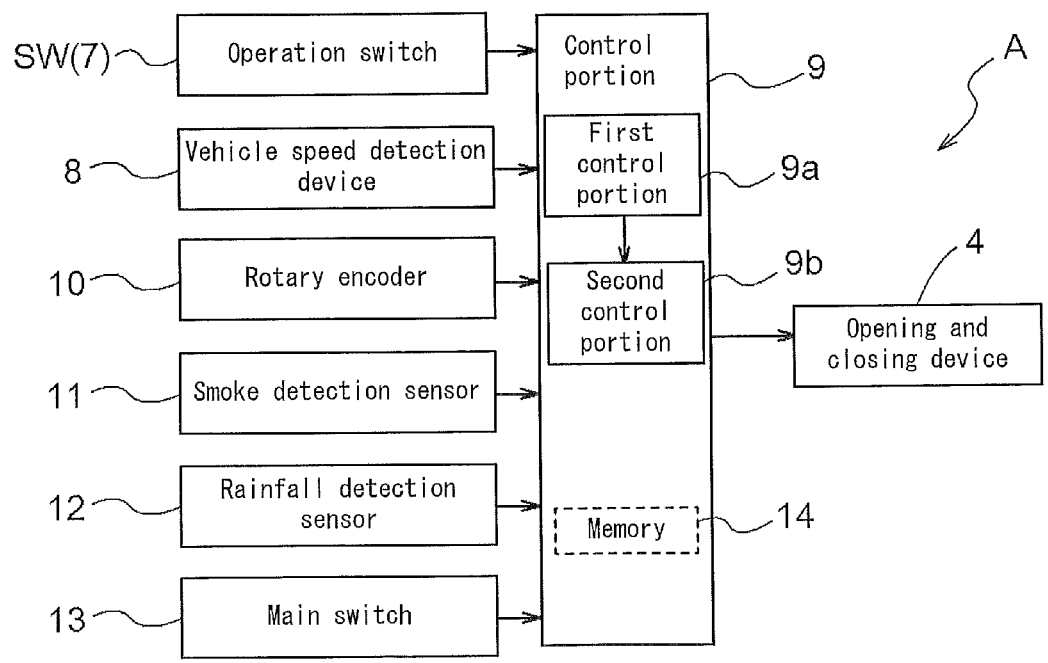
FIG. 2 is a block diagram of an opening and closing control apparatus provided at the sunroof apparatus according to the embodiment of the present invention.

As also illustrated in FIG. 2, the sunroof apparatus B includes an opening and closing control apparatus A for the roof panel 3. The opening and closing control apparatus A mainly includes an operation command means 7 that outputs an operation command for either opening or closing the roof panel 3 by means of an operation switch SW, a vehicle speed detection device 8 serving as a vehicle speed detecting means, and a control portion 9 serving as a controlling means for controlling an operation of the opening and closing device 4.

The operation switch SW is alternatively shifted to an open position or a close position as illustrated in FIG. 1 to thereby bring the roof panel 3 to move in an open direction or a close direction. The operation switch SW is provided at an overhead module above a driver's seat, for example. When the operation switch SW is moved to the open position and is then turned on (i.e., the operation switch SW in the open position is turned on or operated), the operation command for opening the roof panel 3 (i.e., an open operation command) is output. On the other hand, when the operation switch SW is shifted to the close position and is then turned on (i.e., the operation switch SW in the close position is turned on or operated), the operation command for closing the roof panel 3 (i.e., a close operation command) is output. The operation switch SW is biased so as to return to a neutral position when not operated (i.e., the operation switch is in an OFF state).

As illustrated in FIG. 2, the control portion 9 controls an operation of the opening and closing device 4 by driving the motor 6 in a forward direction or a rearward direction based on input signals from the operation switch SW, the vehicle speed detection device 8, a rotary encoder 10, a smoke detection sensor 11, a rainfall detection sensor 12, and a main switch 13. The rotary encoder 10 serves as a position detecting means for detecting a present position of the roof panel 3. The smoke detection sensor 11 detects smoke in a vehicle interior. The rainfall detection sensor 12 detects rainfall. The main switch 13 is operated, being turned on or off by means of an engine key.

The control portion 9 includes a first control portion 9a, a second control portion 9b, and a memory 14 that stores data for control. The first control portion 9a determines a control mode of an open and close control that is followed and executed by the second control portion 9b. That is, the first control portion 9a outputs a signal indicating the control mode to the second control portion 9b. The second control portion 9b then performs the open and close control for operating the opening and closing device 4 in the control mode determined by the first control portion 9a when the operation command is output by means of the operation switch SW.

The first control portion 9a changes the control mode, with which the second control portion 9b complies, between a stop mode and a nonstop mode.

In a case where the operation switch SW in the open position is turned on so that the open operation command is output in a state where the signal indicating the stop mode is output to the second control portion 9b, the open and close control is then performed by the second control portion 9b.

That is, according to the stop mode, the roof panel 3 is stopped at a predetermined position where the roof panel 3 is opened to a predetermined degree, which is specified beforehand on the basis of a vehicle speed, when the roof panel 3 reaches the predetermined position during the opening operation. When the roof panel 3 is arranged at the predetermined position, the roof panel 3 is opened as wide as possible under the condition that a reduced airflow into the vehicle interior is obtained. The predetermined position is stored beforehand within the memory 14.

According to the nonstop mode, the roof panel 3 is prevented from being stopped at the predetermined position even when the roof panel 3 reaches the predetermined position while the roof panel 3 is opening or closing after the open operation command or the close operation command is output from the operation switch SW.

Thus, when the open operation command is output from the operation switch SW in a state where the signal of the stop mode is output by the first control portion 9a, the second control portion 9b performs the open and close control for operating the opening and closing device 4 in such a way that the roof panel 3 moves and reaches the predetermined position where the roof panel 3 is opened to the predetermined degree that is specified beforehand on the basis of the vehicle speed.

The switching of the control mode by the first control portion 9a is achieved by a continuous ON operation of the operation switch SW in the open position when the roof panel 3 is arranged at the fully open position or by a continuous ON operation of the operation switch SW in the close position when the roof panel 3 is arranged at the fully closed position, for a predetermined time period or more, for example, 10 seconds or more.

Alternatively, a display lamp indicating the present control mode may be provided at the operation switch SW itself or a side thereof.

A control operation executed by the first control portion 9a will be explained with reference to a flowchart in FIG. 3. In a case where the main switch 13 is turned on when the roof panel 3 is stopped at the fully closed position or the fully open position, the control mode performed at the previous OFF operation of the main switch 13 is read out from the memory 14 (step 1 and step 2 in FIG. 3) (hereinafter, "step" will be simply referred to as "S" so that step 1 will be referred to as S1, for example).

Figure 3:
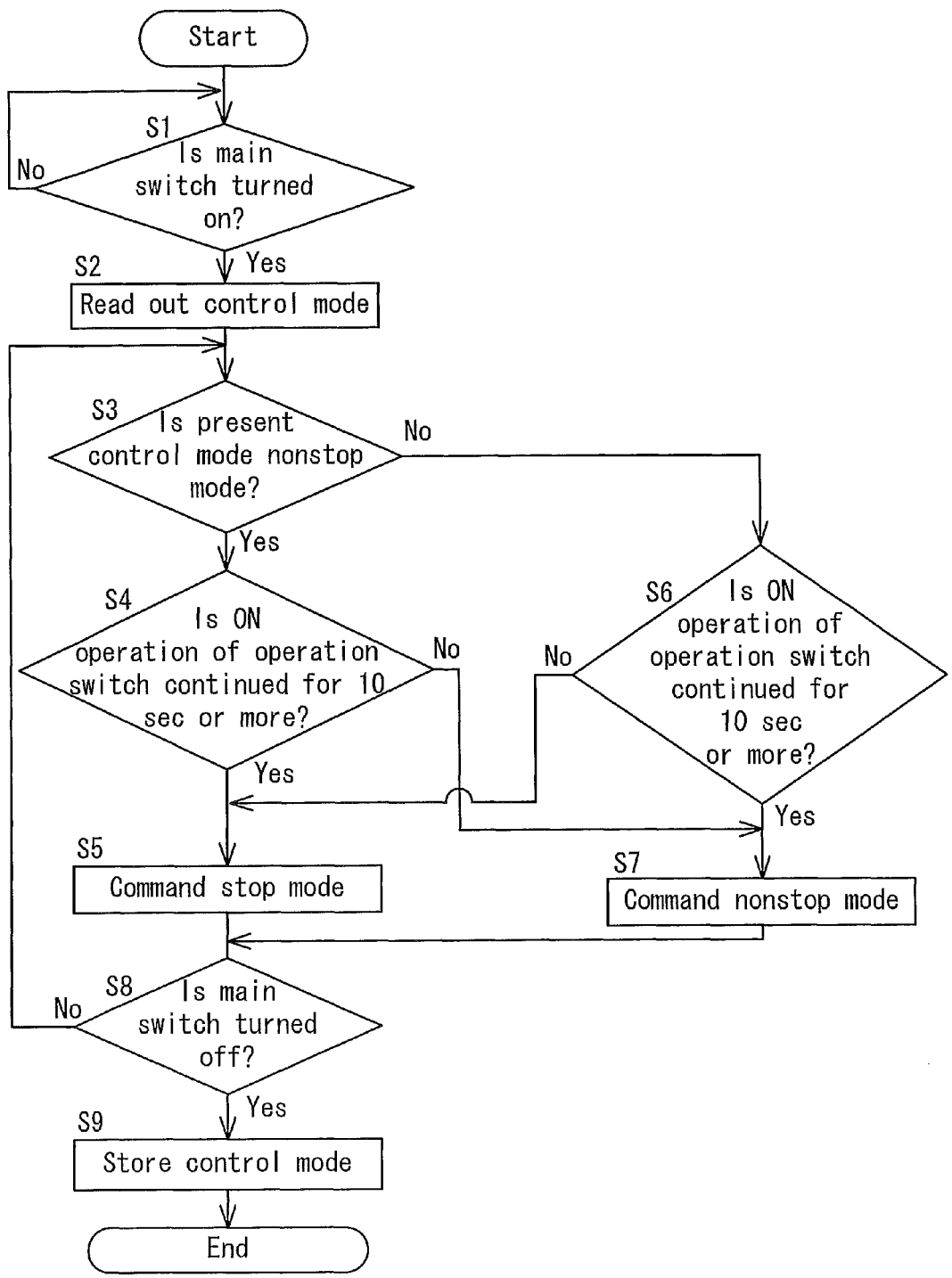
FIG. 3 is a flowchart of a control operation performed by the opening and closing control apparatus according to the embodiment of the present invention.

When the control mode read out from the memory 14 or presently determined is the nonstop mode, and the ON operation of the operation switch SW in the open position when the operation switch SW is in the fully open position or the ON operation of the operation switch SW in the close position when the operation switch SW is in the fully closed position is continued for the predetermined time period or more, for example, 10 seconds or more, the stop mode is directed to the second control portion 9b (S3, S4, and S5 in FIG. 3).

In a case where the control mode read out from the memory 14 or presently determined is the nonstop mode and the aforementioned ON operation is continued for less than the predetermined time period, for example, less than 10 seconds, the nonstop mode is directed to the second control portion 9b (S3, S4, and S7).

In a case where the control mode read out from the memory 14 or presently determined is not the nonstop mode and the aforementioned ON operation is continued for a time period equal to or greater than 10 seconds, the nonstop mode is directed to the second control portion 9b (S3, S6, and S7).

In a case where the control mode read out from the memory 14 or presently determined is not the nonstop mode and the aforementioned ON operation is continued for the time period less than 10 seconds, the stop mode is directed to the second control portion 9b (S3, S6, and S5).

The operation from S3 through S7 is periodically repeated until the main switch 13 is turned off. When the main switch 13 is turned off, the control mode presently directed to the second control portion 9b is stored in the memory 14 and the present routine is terminated (S8 and S9).

Figure 4:
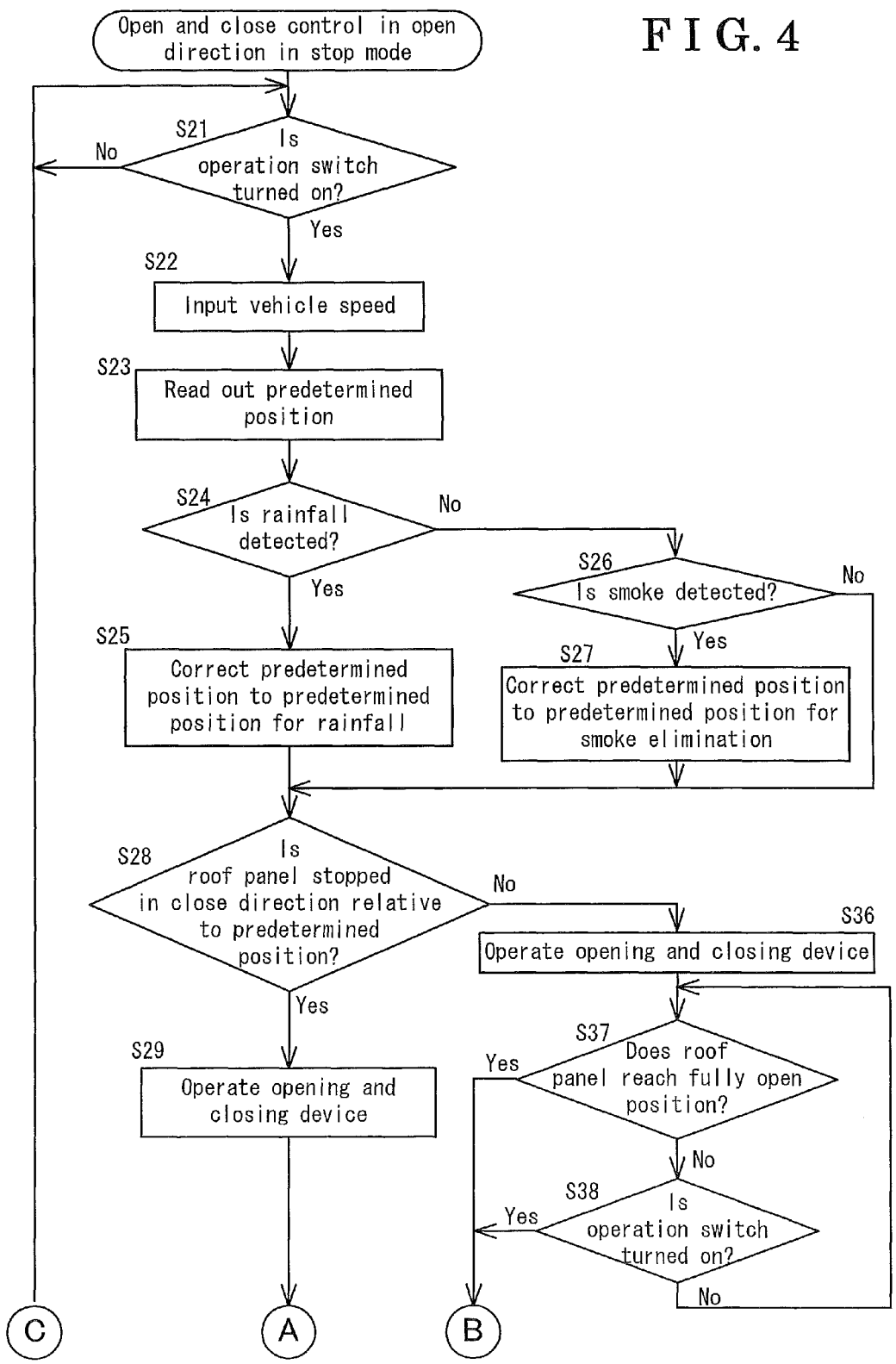
FIG. 4 is a flowchart of an open and close control in an open direction in a stop mode according to the embodiment of the present invention.
Figure 5:
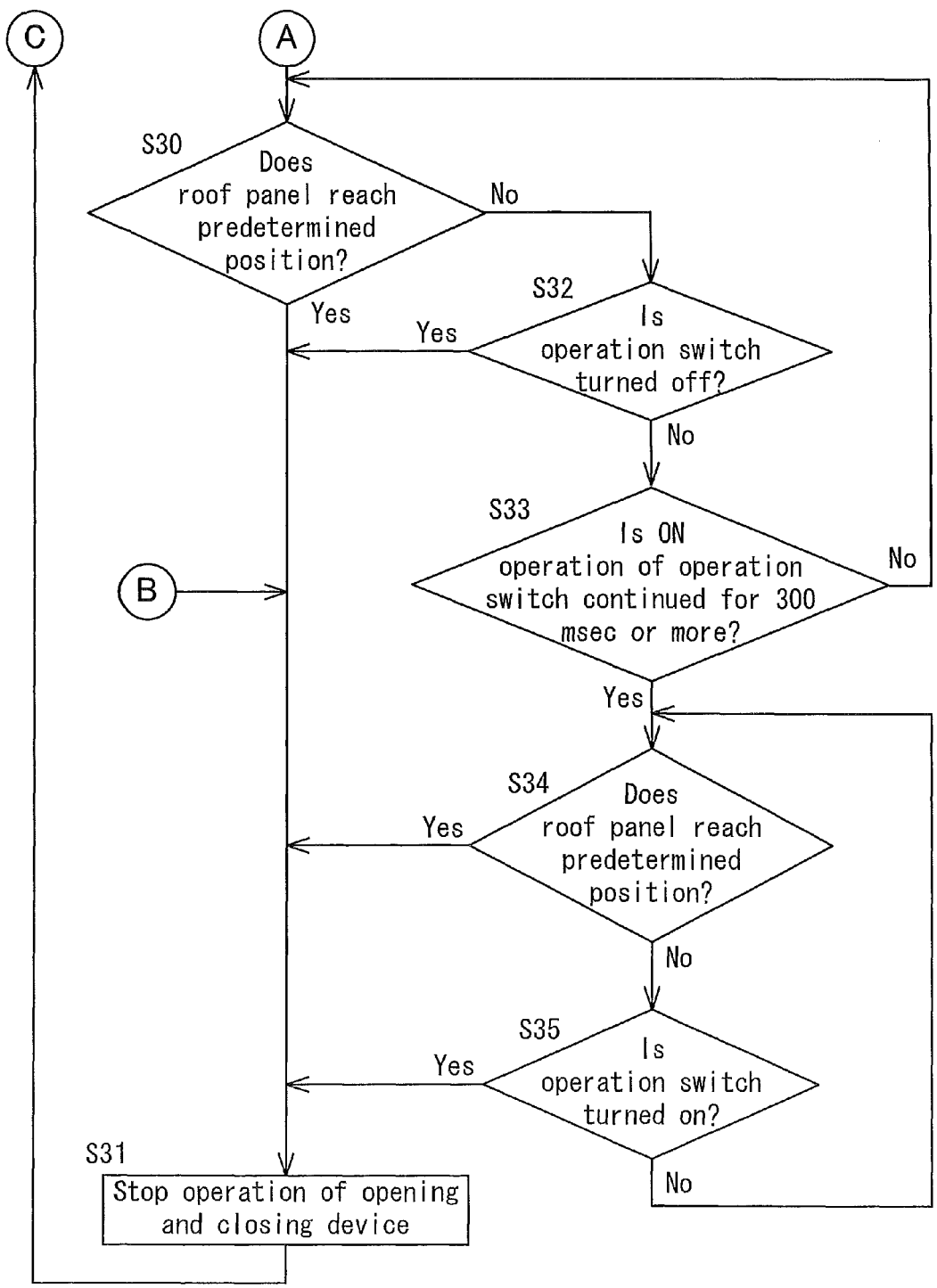
FIG. 5 is a flowchart of the open and close control in the open direction in the stop mode according to the embodiment of the present invention.

Next, a control operation performed by the second control portion 9b will be explained with reference to flowcharts in FIGS. 4 to 7. FIGS. 4 and 5 are flowcharts of the open and close control performed when the open operation command is output by the ON operation of the operation switch SW in the open position in a state where the signal of the stop mode is output by the first control portion 9a.

In a case where the operation switch SW in the open position is turned on so that the open operation command is output, a vehicle speed detected by the vehicle speed detection device 8 at that time, i.e., when the operation switch SW is operated, is input to the control portion 9. Then, in response to the detected vehicle speed, the predetermined position where the roof panel 3 is opened to the predetermined degree is read out from the memory 14 (S21, S22, and S23).

When the rainfall detection sensor 12 detects rainfall, the predetermined position of the roof panel 3 is corrected to a predetermined rainfall position where the roof panel 3 is opened to a degree smaller than the predetermined degree (S24 and S25).

When rainfall is not detected and the smoke detection sensor 11 detects smoke in the vehicle interior, the predetermined position of the roof panel 3 is corrected to a predetermined smoke ventilation position where the roof panel 3 is opened wider than the predetermined degree (S24, S26, and S27).

In a case where the roof panel 3 is stopped in the close direction relative to the predetermined position, the opening and closing device 4 is operated so that the roof panel 3 moves to the predetermined position. When the roof panel 3 moves to reach the predetermined position, the operation of the opening and closing device 4 is stopped (S28, S29, S30, and S31).

In a case where the operation switch SW is turned off before it is determined that the roof panel 3 reaches the predetermined position, the operation of the opening and closing device 4 is stopped (S30, S32, and S31). When the ON operation of the operation switch SW is continued for 300 msec or more, the opening and closing device 4 is continuously operated so that the roof panel 3 is driven to open (i.e., a continuous open operation of the opening and closing device 4) until the roof panel 3 reaches the predetermined position (S32, S33, S34, and S31).

That is, when the ON operation of the operation switch SW is continued for a time period less than 300 msec, the opening and closing device 4 is operated so that the roof panel 3 moves towards the predetermined position in response to the time period of the ON operation.

When the operation switch SW in the open position or the close position is newly turned on after the initiation of the continuous open operation of the opening and closing device 4 and before it is determined that the roof panel 3 reaches the predetermined position in S34, the continuous open operation of the opening and closing device 4 is stopped (S34, S35, and S31).

When the open operation command is again output after the roof panel 3 reaches the predetermined position during the open and close control in the stop mode, the opening and closing device 4 is operated so that the roof panel 3 moves to the fully open position.

That is, when it is determined that the roof panel 3 is stopped at the predetermined position or in the open direction relative to the predetermined position in S28, the opening and closing device 4 is operated so that the roof panel 3 moves to the fully open position (S36, S37, and S31).

In a case where the operation switch SW is newly turned on to either the OPEN side or the CLOSE side before it is determined that the roof panel 3 moves and reaches the fully open position in S37, the operation of the opening and closing device 4 is stopped (S37, S38, and S31).

Figure 6:
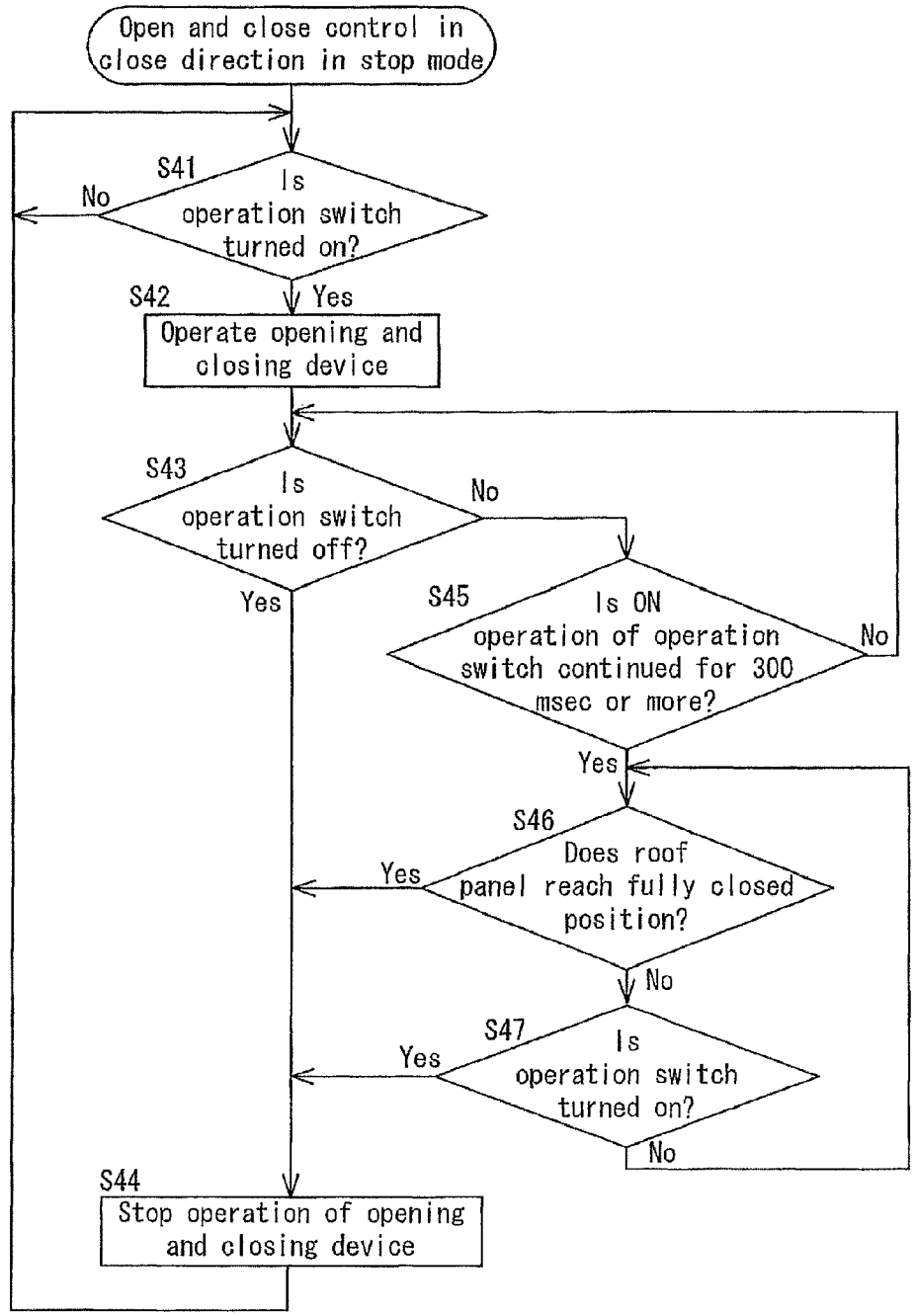
FIG. 6 is a flowchart of the open and close control in a close direction in the stop mode according to the embodiment of the present invention.

FIG. 6 is a flowchart of the open and close control in the close direction in a case where the signal of the stop mode is output by the first control portion 9a. The open and close control in the close direction is executed by the close operation command, which is output by means of the ON operation of the operation switch SW in the close position.

In a case where the operation switch SW in the close position is turned on so that the close operation command is output, the opening and closing device 4 is operated to move the roof panel 3 to the fully closed position (S41 and S42).

When the operation switch SW is turned off before the roof panel 3 reaches the fully closed position, the operation of the opening and closing device 4 is stopped (S43 and S44). In a case where the ON operation of the operation switch SW is continued for a time period equal to or greater than 300 msec, the opening and closing device 4 is continuously operated until the roof panel 3 reaches the fully closed position (S45).

That is, when the ON operation of the operation switch SW is continued for a time period less than 300 msec, the opening and closing device 4 is operated so that the roof panel 3 moves towards the fully closed position in response to the time period of the ON operation (S45).

In a case where the operation switch SW in the open position or the close position is newly turned on before it is determined that the roof panel 3 reaches the fully closed position, the operation of the opening and closing device 4 is stopped (S46, S47, and S44).

Figure 7:
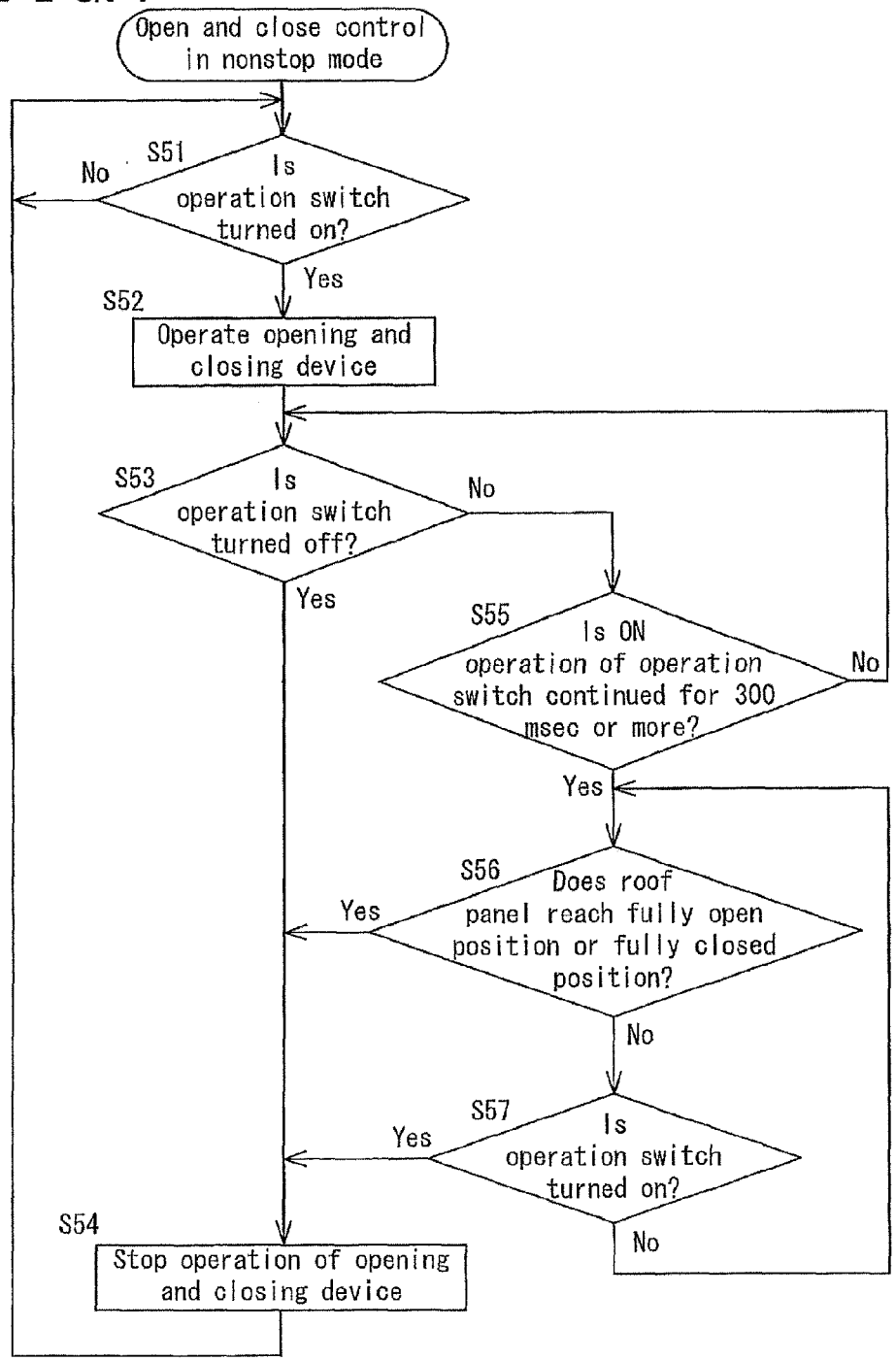
FIG. 7 is a flowchart of the open and close control in a nonstop mode according to the embodiment of the present invention.

FIG. 7 is a flowchart illustrating the open and close control performed by the second control portion 9b when the nonstop mode is directed. When the operation switch SW in the open position or the close position is turned on and thus the operation command is output, the opening and closing device 4 is operated so that the roof panel 3 moves towards the fully open position or the fully closed position (S51 and S52).

In a case where the operation switch SW is turned off before the roof panel 3 reaches the fully open position or the fully closed position, the operation of the opening and closing device 4 is stopped (S53 and S54). When the ON operation of the operation switch SW is continued for a time period equal to or greater than 300 msec, the opening and closing device 4 is continuously operated until the roof panel 3 reaches the fully open position or the fully closed position (S55 and S56).

That is, when the ON operation of the operation switch SW is continued for a time period less than 300 msec, the opening and closing device 4 is operated so that the roof panel 3 moves towards the fully open position or the fully closed position in response to the time period of the ON operation.

When the operation switch SW in the open position or the close position is newly turned on before it is determined that the roof panel 3 reaches the fully closed position or the fully open position in S56, the operation of the opening and closing device 4 is stopped (S56, S57, and S54).

The present embodiment may be applicable to an opening and closing control apparatus for a roof panel for a transportation means such as a railcar and a vessel. In addition, the present embodiment may include the opening and closing device for driving the roof panel to pivotally open and close.

According to the aforementioned embodiment, when the open operation command is output by means of the operation switch SW, the roof panel 3 moves and reaches the predetermined position where the roof panel 3 is opened to the predetermined degree that is specified beforehand on the basis of the vehicle speed. Thus, by operating the operation switch SW one time for opening the roof panel 3, the roof panel 3 is stopped at a position with less noise caused by air flowing into the vehicle, which leads to the opening and closing control apparatus that performs the reasonable and secure open and close control.

The roof panel 3 is opened as wide as possible under a condition that a reduced air flow into a vehicle interior is obtained when the roof panel 3 is arranged at the predetermined position which is specified beforehand on the basis of the vehicle speed.

An occurrence of noise caused by air flowing into the vehicle interior is reduced and a passenger is able to have a wide open feeling when the roof panel 3 is widely opened. When the open operation command is again output by means of the operation switch SW after the roof panel 3 reaches the predetermined position, the roof panel 3 moves to the fully open position. Accordingly, the roof panel 3 is able to move and reach the fully open position by means of the operation of the operation switch SW that is used for the output of the open operation command for moving the roof panel 3 to the predetermined position. That is, without the use of a switch separately provided, the roof panel 3 moves and reaches the fully open position.

The control portion 9 switches the control mode of the open and close control between the stop mode in which the roof panel 3 is stopped at the predetermined position in a case where the operation command for opening the roof panel 3 is output and the roof panel 3 reaches the predetermined position and the nonstop mode in which the roof panel 3 is prevented from being stopped at the predetermined position in a case where the operation command for opening the roof panel 3 is output and the roof panel 3 reaches the predetermined position.

In a case where the control mode is switched to the stop mode, the roof panel 3 is once stopped at the predetermined position by the output of the open operation command by means of the operation switch SW. In a case where the control mode is switched to the nonstop mode, the roof panel 3 moves to a desired position, without being stopped at the predetermined position, by the output of the open operation command by means of the operation switch SW.

The stop mode and the nonstop mode are switched therebetween by an operation of the operation switch SW for a predetermined time period or more.

The control mode is switched between the stop mode and the nonstop mode by a selection of an operation time of the operation switch SW that outputs the operation command for opening or closing the roof panel 3, thereby reducing the number of operation switches.

The stop mode and the nonstop mode are switched therebetween by a continuous operation of the operation switch SW in the open position when the roof panel 3 is arranged at the fully open position or by a continuous operation of the operation switch SW in the close position when the roof panel 3 is arranged at the fully closed position for the predetermined time period or more.

The opening and closing control apparatus A further includes the smoke detection sensor 11 detecting a smoke in the vehicle interior. The control portion 9 performs the open and close control by correcting the predetermined position to the predetermined smoke ventilation position where the roof panel 3 is opened to a greater degree than the predetermined degree in a case where the smoke detection sensor 11 detects smoke in the vehicle interior.

When smoke is detected by the smoke detection sensor 11, the predetermined position is corrected to the predetermined smoke ventilation position where the roof panel 3 is opened greater than where the roof panel 3 is arranged at the predetermined position for the open and close control. Thus, the roof panel 3 is opened greater as compared to a case where smoke is not detected, thereby effectively and immediately emitting the smoke in the vehicle interior to the outside of the vehicle while preventing an occurrence of noise caused by air flowing into the vehicle interior.

The opening and closing control apparatus A further includes the rainfall detection sensor 12 detecting rainfall. The control portion 9 performs the open and close control by correcting the predetermined position to the predetermined rainfall position where the roof panel 3 is opened to a smaller degree than the predetermined degree in a case where the rainfall detection sensor 12 detects rainfall.

When rainfall is detected by the rainfall detection sensor 12, the predetermined position is corrected to the predetermined rainfall position where the roof panel 3 is opened narrower than where the roof panel 3 is arranged at the predetermined position. Thus, the roof panel 3 is opened narrower as compared to a case where rainfall is not detected, thereby preventing intrusion of rainfall into the vehicle interior while preventing an occurrence of noise caused by air flowing into the vehicle interior.

The control portion 9 performs the open and close control by correcting the predetermined position to the predetermined rainfall position where the roof panel 3 is opened to a smaller degree than the predetermined degree in a case where the rainfall detection sensor 12 detects rainfall in spite of whether the smoke detection sensor 11 detects the smoke in the vehicle interior.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening and closing control apparatus for a roof panel for a vehicle, comprising:
    an opening and closing device for driving the roof panel to open and close;
    an operation switch for outputting an operation command for opening and closing the roof panel;
    a vehicle speed detecting means; and
    a controlling means for controlling an operation of the opening and closing device, the controlling means performing an open and close control for operating the opening and closing device to cause the roof panel to move to a predetermined position where the roof panel is opened to a predetermined degree which is specified beforehand on the basis of a vehicle speed when the operation command for opening the roof panel is output by the operation switch;
    wherein the controlling means switches a control mode of the open and close control between a stop mode in which the roof panel is stopped at the predetermined position in a case where the operation command for opening the roof panel is output and the roof panel reaches the predetermined position and a nonstop mode in which the roof panel is prevented from being stopped at the predetermined position in a case where the operation command for opening the roof panel is output and the roof panel reaches the predetermined position;
    wherein the stop mode and the nonstop mode are switched therebetween by an operation of the operation switch for a predetermined time period or more;
    wherein the stop mode and the nonstop mode are switched therebetween by a continuous operation of the operation switch in an open position when the roof panel is arranged at a fully open position or by a continuous operation of the operation switch in a close position when the roof panel is arranged at a fully closed position for the predetermined time period or more.

2. The opening and closing control apparatus according to claim 1, wherein the roof panel is opened as wide as possible so that a reduced air flow into a vehicle interior is obtained when the roof panel is arranged at the predetermined position which is specified beforehand on the basis of the vehicle speed;

wherein the reduced air flow is less than an air flow into the vehicle interior when the roof panel is moved to the fully open position.

3. The opening and closing control apparatus according to claim 1, wherein the controlling means performs the open and close control for operating the opening and closing device to cause the roof panel to move to the fully open position in a case where the operation command for opening the roof panel is again output after the roof panel reaches the predetermined position.

4. The opening and closing control apparatus according to claim 1, wherein the roof panel is opened as wide as possible so that a reduced air flow into the vehicle interior is obtained when the roof panel is arranged at the predetermined position which is specified beforehand on the basis of the vehicle speed, and the controlling means performs the open and close control for operating the opening and closing device to cause the roof panel to move to the fully open position in a case where the operation command for opening the roof panel is again output after the roof panel reaches the predetermined position;

wherein the reduced air flow is less than an air flow into the vehicle interior when the roof panel is moved to the fully open position.

5. The opening and closing control apparatus according to claim 1, further comprising a smoke detection sensor detecting smoke in the vehicle interior, wherein the controlling means performs the open and close control by correcting the predetermined position to a predetermined smoke ventilation position where the roof panel is opened to a greater degree than the predetermined degree in a case where the smoke detection sensor detects smoke in the vehicle interior.

6. The opening and closing control apparatus according to claim 5, further comprising a rainfall detection sensor detecting rainfall, wherein the controlling means performs the open and close control by correcting the predetermined position to a predetermined rainfall position where the roof panel is opened to a smaller degree than the predetermined degree in a case where the rainfall detection sensor detects rainfall.

7. The opening and closing control apparatus according to claim 6, wherein the controlling means performs the open and close control by correcting the predetermined position to the predetermined rainfall position where the roof panel is opened to a smaller degree than the predetermined degree in a case where the rainfall detection sensor detects rainfall in spite of whether the smoke detection sensor detects the smoke in the vehicle interior.

8. The opening and closing control apparatus according to claim 1, further comprising a rainfall detection sensor detecting rainfall, wherein the controlling means performs the open and close control by correcting the predetermined position to a predetermined rainfall position where the roof panel is opened to a smaller degree than the predetermined degree in a case where the rainfall detection sensor detects rainfall.

\* \* \* \* \*